United States Patent
Barsnick et al.

(10) Patent No.: US 12,497,119 B2
(45) Date of Patent: Dec. 16, 2025

(54) MOTORBIKE SWINGARM COVER

(71) Applicants: Bryce Barsnick, Livermore, CA (US); Devin Funaro, Livermore, CA (US)

(72) Inventors: Bryce Barsnick, Livermore, CA (US); Devin Funaro, Livermore, CA (US)

( * ) Notice: Subject to any disclaimer, the term of this patent is extended or adjusted under 35 U.S.C. 154(b) by 493 days.

(21) Appl. No.: 18/067,000

(22) Filed: Dec. 15, 2022

(65) Prior Publication Data

US 2023/0182846 A1 Jun. 15, 2023

Related U.S. Application Data (60) Provisional application No. 63/290,005, filed on Dec. 15, 2021.

(51) Int. Cl.
*B62J 23/00* (2006.01)

(52) U.S. Cl.
CPC ..................................... *B62J 23/00* (2013.01)

(58) Field of Classification Search
CPC ................................ B62J 23/00; B62K 25/20
USPC ...................................................... 280/304.3
See application file for complete search history.

(56) References Cited

U.S. PATENT DOCUMENTS

| | | | | |
|---|---|---|---|---|
| 9,487,260 | B1 * | 11/2016 | Seehorn | B62J 23/00 |
| 10,384,738 | B1 * | 8/2019 | Toler | B62J 23/00 |
| 11,110,987 | B2 * | 9/2021 | McDonald | B62K 25/286 |
| D1,014,337 | S * | 2/2024 | Dunshee | D12/117 |
| 11,919,593 | B2 * | 3/2024 | Mayuzumi | B62K 25/283 |
| D1,068,567 | S * | 4/2025 | Dunshee | D12/114 |
| 2009/0314569 | A1 * | 12/2009 | Riesterer | B62J 23/00 411/429 |
| 2015/0076792 | A1 * | 3/2015 | Stillwell | B62K 25/04 280/304.3 |
| 2016/0207582 | A1 * | 7/2016 | Stillwell | B62J 23/00 |
| 2018/0215440 | A1 * | 8/2018 | Omosako | B62K 25/283 |
| 2020/0055560 | A1 * | 2/2020 | Lehrbaum | F01N 13/04 |
| 2023/0182846 | A1 * | 6/2023 | Barsnick | B62K 25/283 280/304.3 |
| 2024/0017789 | A1 * | 1/2024 | Behrman | B22D 21/04 |

FOREIGN PATENT DOCUMENTS

| | | | | |
|---|---|---|---|---|
| DE | 102017130650 A1 * | 8/2018 | | B62K 11/04 |
| DE | 102017204464 A1 * | 9/2018 | | B62D 21/00 |
| DE | 102019125192 A1 * | 4/2020 | | B62J 15/00 |
| DE | 202021105108 U1 * | 12/2022 | | B62J 23/00 |
| EP | 4335733 A1 * | 3/2024 | | B62J 1/12 |
| JP | S60175790 U * | 11/1985 | | |
| JP | 2023150537 A * | 10/2023 | | B62K 25/20 |
| WO | WO-2018154149 A1 * | 8/2018 | | B62L 1/00 |
| WO | WO-2019021540 A1 * | 1/2019 | | B62K 11/04 |
| WO | WO-2021220483 A1 * | 11/2021 | | B62K 25/20 |

* cited by examiner

*Primary Examiner* — James A Shriver, II (57) ABSTRACT

A motorbike swingarm cover incudes a protective cover that covers at least a portion of the outer face of the motorbike swingarm. Said cover is secured to the motorbike swingarm through a cable lashing in the frontward portion of the cover, and a bracketed attachment in the rearward portion of the cover. Said bracketed attachment will secure onto both the cover and onto the motorbike swingarm by way of an included mounting feature on the swingarm.

1 Claim, 6 Drawing Sheets

MOTORBIKE SWINGARM COVER

This patent application claims benefit of U.S. Provisional Patent Application Ser. No. 63/290,005 filed 15 Dec. 2021. The entire disclosure the aforementioned provisional patent application is incorporated by reference herein.

BACKGROUND

The present disclosure relates to a bracket that can be used to attach a protective cover onto the swingarm of a motorbike.

Motorbike swingarm covers exists to prevent damage to the motorbike swingarm when impacting obstacles. In order for the swingarm cover to be effective it requires secure mounting to the swingarm. Some existing swingarm guards rely solely on cable lashing (such as zip-ties) to secure the cover to the swingarm. It has been found that this method of mounting is prone to failure when impacting obstacles which leads to the swingarm cover being stripped from the swingarm. Thus, leaving the swingarm unprotected and vulnerable to damage.

Accordingly, there remains a need in the art for improved swingarm covers that integrate a more secure method of mounting that is less prone to failure when impacting obstacles.

It should be noted that the motorbike swingarm may include two external faces that would require a motorbike swingarm cover on each side to fully protect the swingarm. Herein there will only be reference made and illustrations shown for a single motorbike swingarm cover mounted to one side of a motorbike swingarm. All the relevant fundamental concepts are applicable for either side and can be used to integrate a motorbike swingarm cover to either side of a motorbike swingarm by anyone skilled in the art.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

1. Definitions

For the purposes of describing embodiments of the present invention and claims, a motorbike swingarm cover is defined as the multiple component assembly designed to mount onto a motorbike swingarm and either protect, conceal and/or aid in the performance of the motorbike swingarm.

For the purposes of describing embodiments of the present invention and claims, a swingarm cover (hereinafter also called a "cover") is defined as one or multiple components in the motorbike swingarm cover assembly that is designed to protect, conceal, and/or aid in the performance of the motorbike swingarm.

For the purposes of describing embodiments of the present invention and claims, a right-angle bracket (hereinafter also called a "bracket") is defined as one or multiple components in the motorbike swingarm cover assembly that is designed to mount the swingarm cover onto the motorbike swingarm.

2. Overview of Embodiments of System and Components

In one embodiment, the present invention is a system that comprises a cover, cable lashing, bracket, and one or more cover-to-bracket fastener(s).

(a) Embodiments of the present invention could be combined to where the cover and bracket are one component and do not require cover-to-bracket fasteners.
(b) Embodiments of the present invention could include one or more holes and/or slots in the portion of the cover that is in contact with the bracket.
(c) Embodiments of the present invention could include any feature(s) on the bracket (hole, fork, or other) that can be used to attach the bracket to the swingarm axle adjustment bolt, also known as a chain tensioning bolt.
(d) Embodiments of the present invention could include one or more threaded hole(s) within the bracket to be used for cover securement via one or more screw(s).
(e) Embodiments of the present invention could include one or more hole(s) within the bracket to allow for cover securement via one or more bolt(s).
(f) Embodiments of the present invention could include one or more fastener(s) and/or latch(s) used to secure the cover to the bracket.
(g) Embodiments of the present invention could include vibration dampening and/or cushioning material between the bracket and swingarm.
(h) Embodiments of the present invention could include a rubberized coating on the bracket and/or swingarm in order to prevent against damage due to contact.
(i) Embodiments of the present invention could include plating and/or coating on the bracket for environmental protection and/or aesthetic appeal.
(j) Embodiments of the present invention could include an outer plate that can be placed on the exterior of the cover. This outer plate can be used to secure the cover between the bracket and said outer plate. This outer plate would be mounted parallel to the portion of the bracket located on the outer face of the swingarm. Once the outer plate is secured to the bracket, the cover, located between the bracket and outer plate, will be unable to move.
(k) Embodiments of the present invention could incorporate bonding (epoxy, tape or other) in cover attachment to the bracket.

It should be noted that embodiments of the present invention can incorporate any combination of the above attributes in any combination and configuration capable of being understood by anyone skilled in the art.

3. Description of Embodiments

Figure 1:
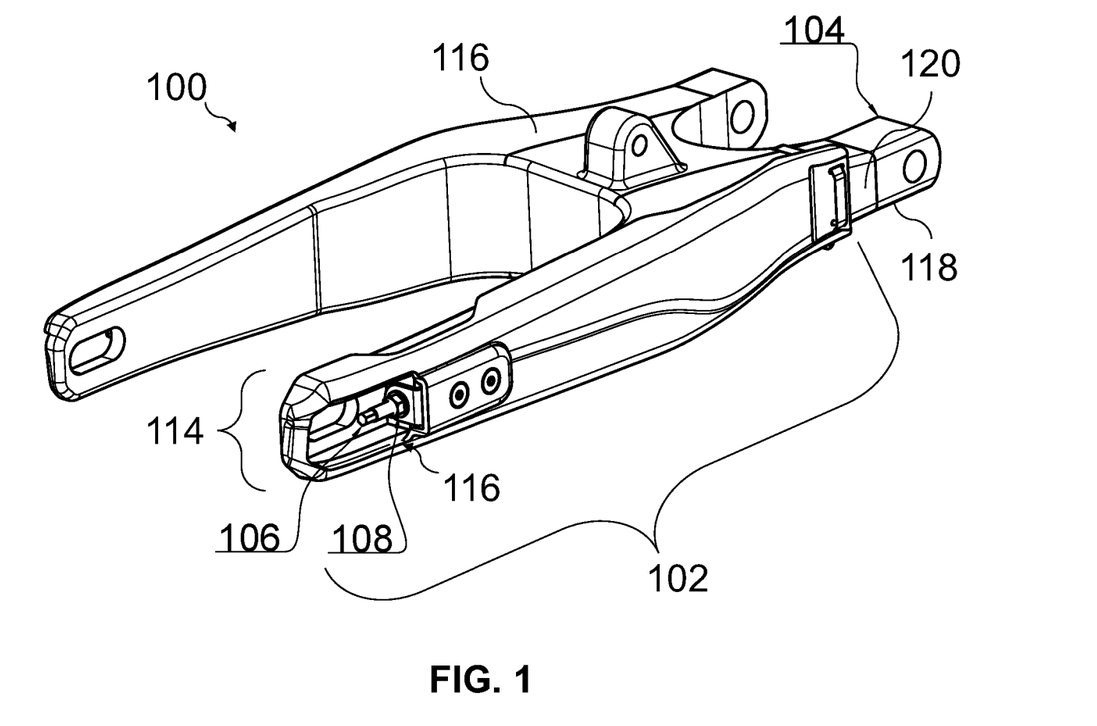
FIG. 1 illustrates a perspective view of an example motorbike swingarm cover coupled to a motorbike swingarm.

FIG. 1 illustrates a perspective view 100 of an example motorbike swingarm cover 102 coupled to a motorbike swingarm 104. The motorbike swingarm 104 may include an adjustment bolt 106 and associated locking adjustment nut 108 connected to the rear swingarm region 110; these are common components included on the motorbike swingarm 104 used to enable rear axle positional adjustment. While FIG. 1 illustrates the motorbike swingarm 104 being from a dirt bike for offroad use (e.g., Enduro bike, Endurocross bike, Motocross bike, Super Moto bike, Supercross bike, Free-style bike, Trials bike, etc.), the motorbike swingarm 104 may be from a dual-purpose bike, on/off road bike, street bike, cruiser bike, sport bike, touring bike, sport touring bike, etc.

The motorbike swingarm cover 102 may provide protection for the motorbike swingarm 104 when contacting an obstacle on a surface (e.g., ground, floor, deck, etc.). For example, under motorbike operation in an uncontrolled environment (e.g., outside in woodlands, forests, deserts, beaches, etc.) and/or in controlled environments (e.g., indoor and/or outdoor off-road motorbike race courses) having natural or man-made obstacles (e.g., rocks, cobbles, boulders, logs, tires, concrete blocks, concrete slabs, wood blocks, wood planks, bricks, etc.) the motorbike swingarm cover 102 may prevent damage to the motorbike swingarm 104 when contacting said obstacles.

FIG. 1 illustrates the example motorbike swingarm cover 102 coupled to the motorbike swingarm 104. The example motorbike swingarm cover 102 can be seen to extend across the outward face 120 of the motorbike swingarm 104 and wrap around the edges to cover the upper face 116 and lower face 118 of the motorbike swingarm 104. In addition, the example motorbike swingarm cover 102 may conceal the rear end 114 of the motorbike swingarm 104 with exclusion to an included aperture 116 which may allow access to the adjustment bolt 106 and associated locking adjustment nut 108, which may be necessary for installation.

Figure 2A:
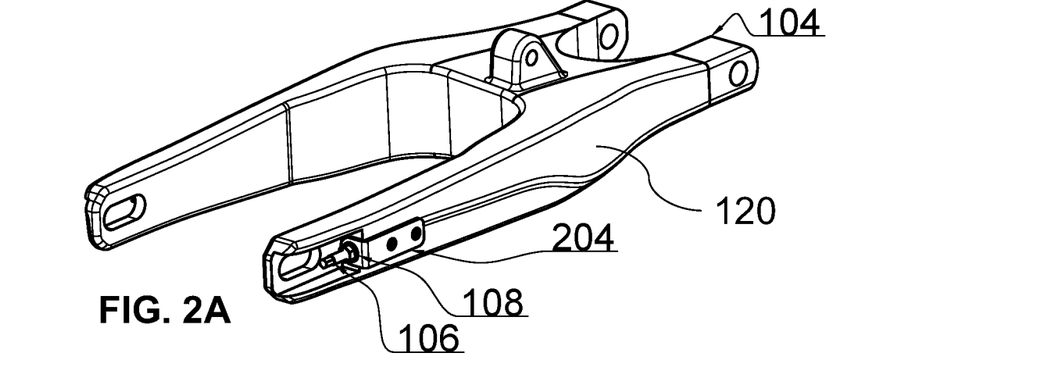
FIG. 2A illustrates a perspective view of an example bracket coupled to the motorbike swingarm.
Figure 2B:
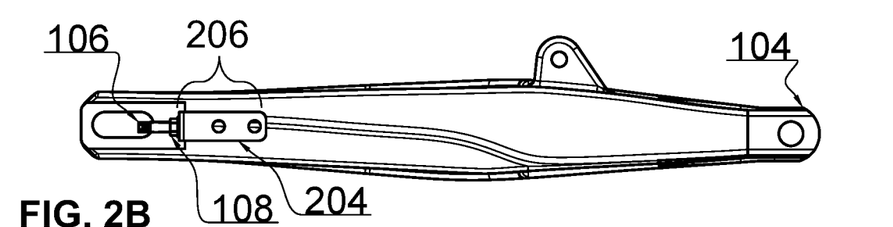
FIG. 2B illustrates a side view of an example bracket coupled to the motorbike swingarm.
Figures 2C, 2D:
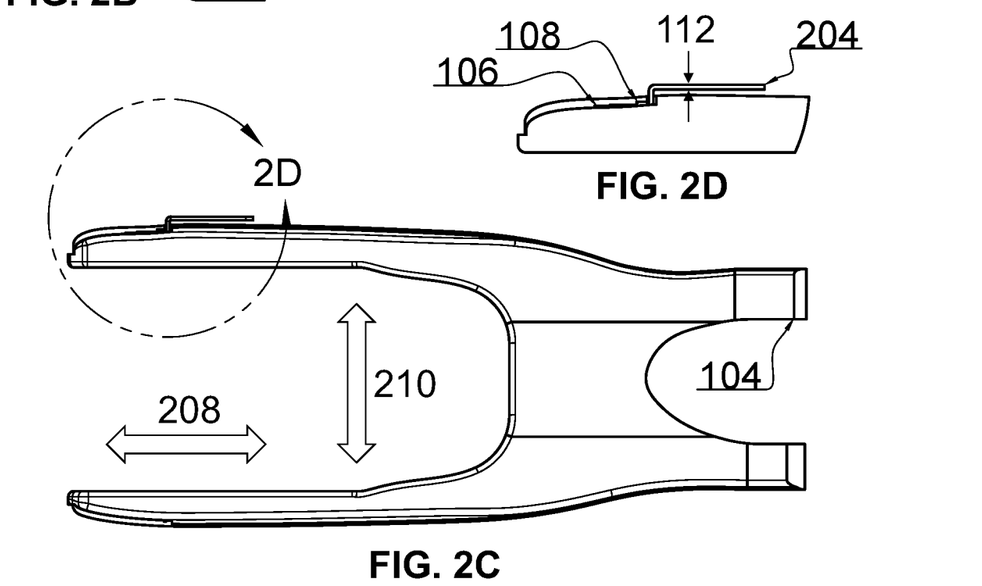
FIG. 2C illustrates a bottom view of an example bracket coupled to the motorbike swingarm.
FIG. 2D illustrates a detailed view 2D of FIG. 2C showing an example bracket coupled to the motorbike swingarm.

FIG. 2A through FIG. 2C illustrates the novel use of the adjustment bolt 106 and associated locking adjustment nut 108 as a connection point between the motorbike swingarm 104 and the motorbike swingarm cover 102 by way of a bracket 204. The bracket 204 is located on the motorbike swingarm 104 by the adjustment bolt 106 which may pass through the bracket 204 and thread into the swingarm 104, as done under normal operation. The locking adjustment nut 108 on the axle adjustment bolt 106 may interface with the bracket 204 and, when tightened, secure the bracket 204 against the motorbike swingarm 104. The bracket 204 may limit the range of adjustment of the axle adjustment bolt 106 by as much as the bracket thickness 212, seen in FIG. 2D. The bracket 204 may not hinder any other aspect of normal operation.

The majority of expected forces to be imparted onto the motorbike swingarm cover 102 when contacting said obstacles will be directed in either the longitudinal 208 or horizontal 210 directions, as shown in FIG. 2C. Once the bracket 204 has been mechanically clamped against the motorbike swingarm 204 by way of the locking adjustment nut 108, the bracket 204 may be able to resist forces imparted onto it in both the longitudinal 208 and horizontal 210 directions, as shown in FIG. 2C.

The bracket 204 may include an extended portion 206 that extends across the front face 120 of the motorbike swingarm 104. The extended portion 206 may contain features used in attachment of the swingarm cover 306 (shown in FIG. 3A, FIG. 3B and FIG. 3D). For example, the bracket 204 may contain one or more through holes, threaded holes, and/or threaded inserts.

Figure 3A:
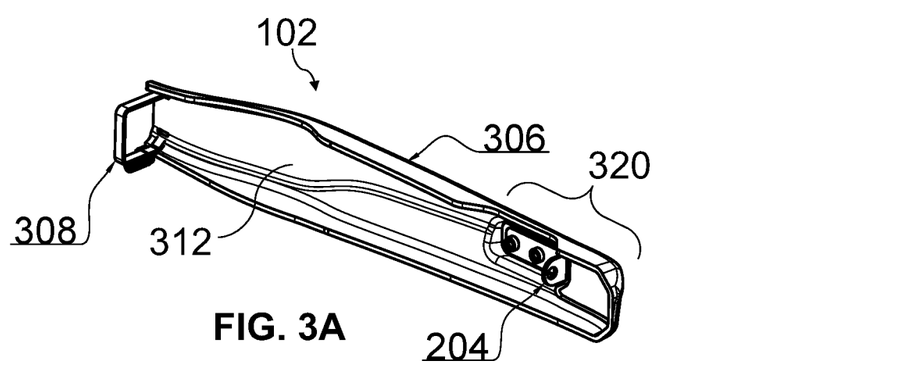
FIG. 3A illustrates a perspective view of the motorbike swingarm cover comprising the swingarm cover, bracket, fasteners, and cable lashing.
Figure 3B:
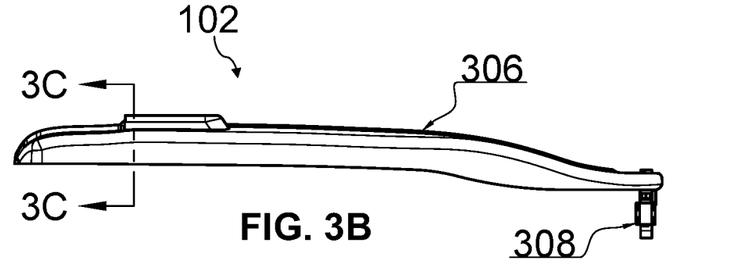
FIG. 3B illustrates a side view of the motorbike swingarm cover comprising the swingarm cover, bracket, fasteners, and cable lashing.
Figure 3C:
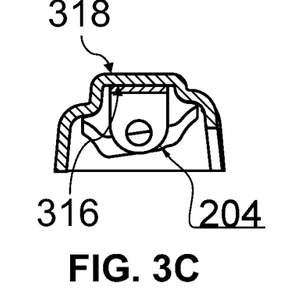
FIG. 3C illustrates a detail view 3C of FIG. 3B showing the swingarm cover and bracket connection.
Figures 5A, 5B, 5C, 5D, 5E, 5F:
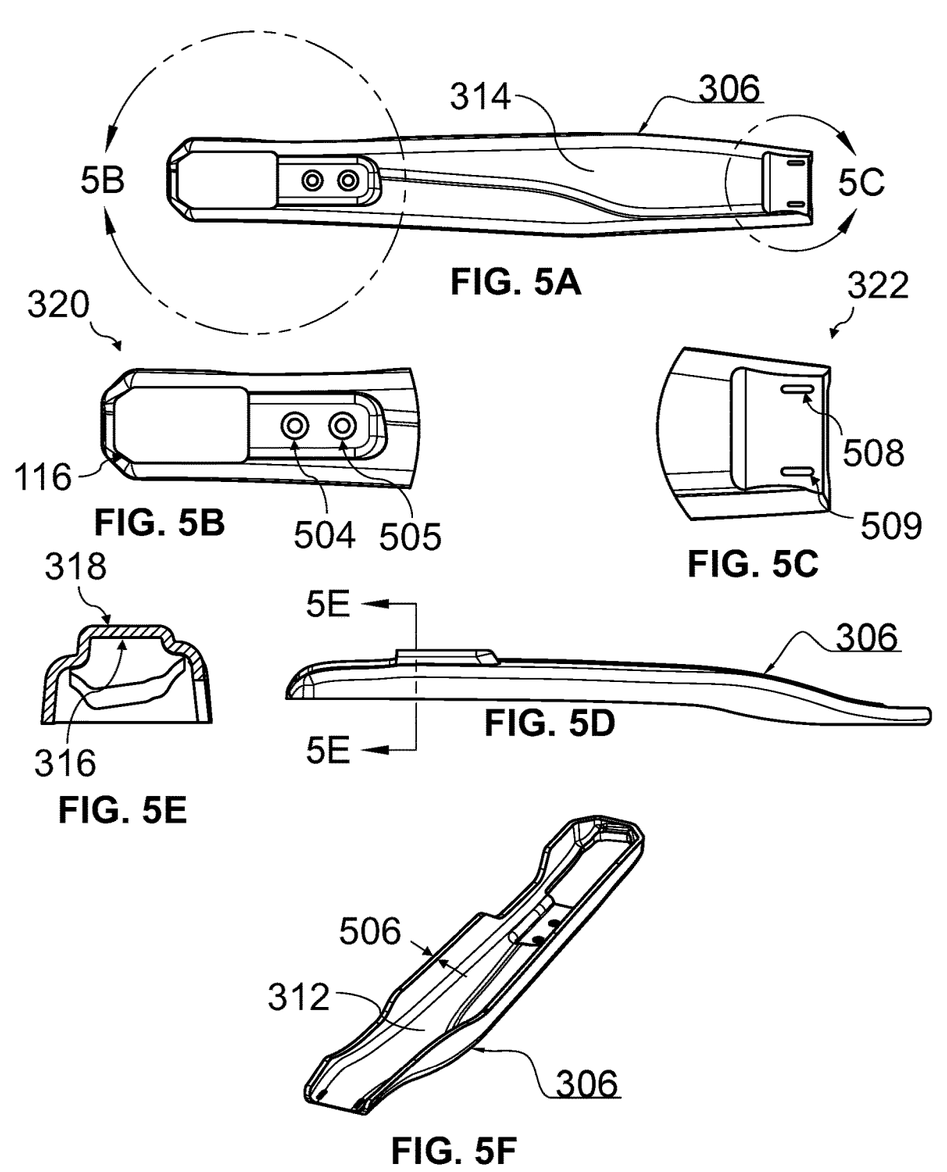
FIG. 5A illustrates a front view of a swingarm cover of the example motorbike swingarm cover illustrated in FIG. 1.
FIG. 5B illustrates a detailed view 5B of FIG. 5A showing the rear cover region of a swingarm cover of the example motorbike swingarm cover illustrated in FIG. 1.
FIG. 5C illustrates a detailed view 5C of FIG. 5A showing the front cover region of a swingarm cover of the example motorbike swingarm cover illustrated in FIG. 1.
FIG. 5D illustrates a side view of a swingarm cover of the example motorbike swingarm cover illustrated in FIG. 1.
FIG. 5E illustrates a section view 5E of FIG. 5D of a swingarm cover of the example motorbike swingarm cover illustrated in FIG. 1.
FIG. 5F illustrates a perspective view of a swingarm cover of the example motorbike swingarm cover illustrated in FIG. 1.

FIG. 3A through FIG. 3E illustrate multiple views of the example motorbike swingarm cover 102 comprising the bracket 204, swingarm cover 306, cable lashing 308, and fasteners 310 and 311. FIG. 3A illustrates the bracket 204 connecting to the interior surface 312 of the swingarm cover 306 in the rear cover region 320. FIG. 5E illustrates an indent 316 on the interior surface 312 of the swingarm cover 306 to allow space for the bracket 204 to be mounted against the swingarm cover 306. To maintain material thickness, the indent 316 may also produce a bump 318 on the exterior surface 314 of the swingarm cover 306. The swingarm cover 306 may include features in the rear cover region 320 for enabling coupling to the bracket 204 via cover-to-bracket fasteners. Once the swingarm cover 306 is coupled to the bracket 204, forces imparted on the swingarm cover 306 in any direction due to obstacles may be at least partially transferred to the bracket 204.

Figures 3D, 3E:
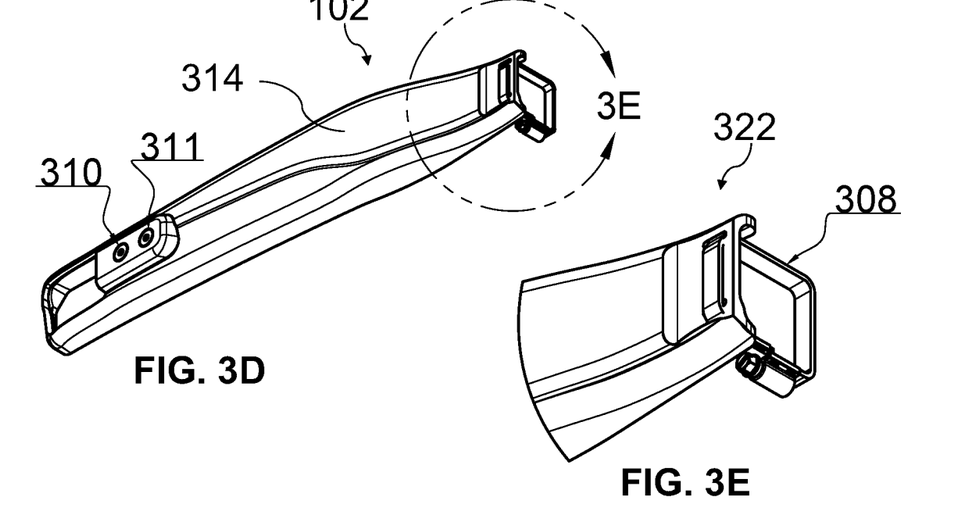
FIG. 3D illustrates a perspective view of the motorbike swingarm cover comprising the swingarm cover, bracket, fasteners, and cable lashing.
FIG. 3E illustrates a detail view 3E of FIG. 3D showing the swingarm cover and cable lashing connection.

FIG. 3D and FIG. 3E illustrate the connection between the swingarm cover 306 and cable lashing 308. The swingarm cover 306 may include features in the front cover region 322 for enabling interconnection to the cable lashing 308 which will tighten around a portion of the motorbike swingarm 204. Once the cable lashing 308 is coupled to the swingarm cover 306 and motorbike swingarm 104, forces imparted onto the swingarm cover 306 may be at least partially transferred to the cable lashing 308. However, the cable lashing 308 is much more resistant to forces imparted in the horizontal 210 directions rather than the longitudinal 208 directions, as shown in FIG. 2C. Therefore, most forces imparted onto the swingarm cover 306 in the longitudinal 210 direction may be transferred to the bracket 204. The ability of the bracket 204 to withstand forces in the longitudinal direction 208 allows for further securement than current art which relies solely on cable lashing 308 for securement of the motorbike swingarm cover 102 to the motorbike swingarm 104.

Figures 4A, 4B, 4C, 4D, 4E, 4F:
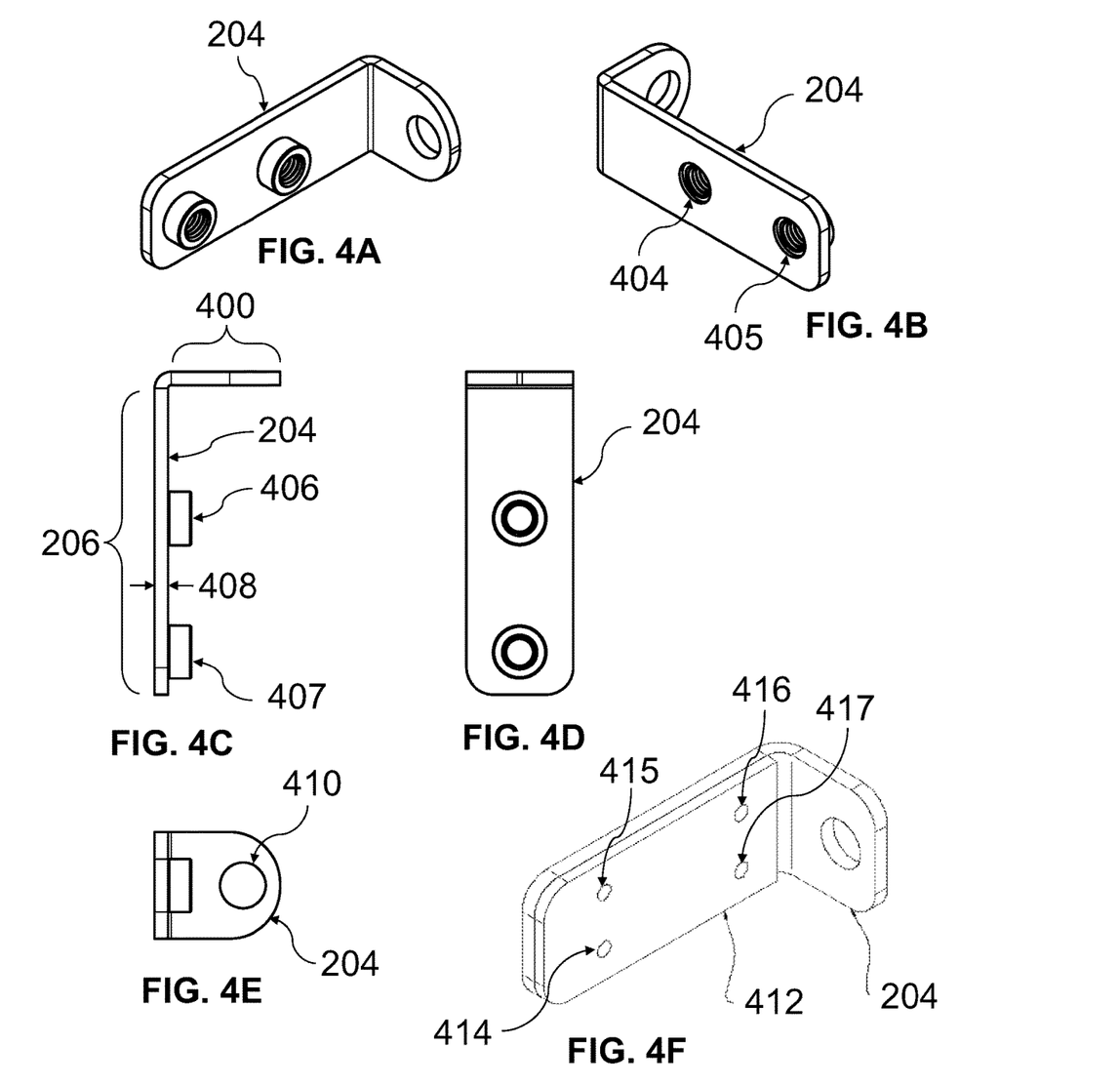
FIG. 4A illustrates a perspective view of a bracket of the example motorbike swingarm cover illustrated in FIG. 1.
FIG. 4B illustrates a perspective view of a bracket of the example motorbike swingarm cover illustrated in FIG. 1.
FIG. 4C illustrates a side view of a bracket of the example motorbike swingarm cover illustrated in FIG. 1.
FIG. 4D illustrates a front view of the example motorbike swingarm cover illustrated in FIG. 1.
FIG. 4E illustrates a bottom view of a bracket of the example motorbike swingarm cover illustrated in FIG. 1.
FIG. 4F illustrates a perspective view of a bracket embodiment different than of the example motorbike swingarm cover illustrated in FIG. 1.

FIG. 4A through FIG. 4F illustrate multiple views and embodiments of the example bracket 204. As illustrated in FIG. 4C, the bracket may comprise of two regions. The first region 400 is configured for attachment to the motorbike swingarm 104 wherein the mounting point is configured for a bracket-to-swingarm fastener. The second region 206 is configured for attachment to the swingarm cover 306 utilizing at least one cover-to-bracket fastener. The first region 400 and second region 206, including subsequent mounting points, may be positioned at an angle of approximately ninety degrees to each other; thus, causing the bracket 204 to have an inherently bent shape.

FIG. 4E illustrates an aperture 410 which is in the first region 400 of the bracket 204 and is configured for attaching the bracket 204 to the motorbike swingarm 104 via a bracket-to-swingarm fastener. The bracket-to-swingarm fastener being the axle adjustment bolt 106 and locking adjustment nut 108. The aperture 410 may have various geometric shapes so long as the axle adjustment bolt 106 may pass through/near the bracket 204 and thread into the motorbike swingarm 104, as done under normal operation, and the locking adjustment nut 108 can be tightened to the swingarm cover 306. For example, the aperture 408 may be a circular through hole with an inner diameter being larger than the outer diameter of the axle adjustment bolt 106, but no larger than the outer diameter of the locking adjustment nut 108, as seen in FIG. 4E.

The bracket 204 illustrated in FIG. 4A through FIG. 4F, may be constructed out of metallic or non-metallic material(s); however, metallic material may be preferable to maintain desired properties (stiffness, strength). With regards to manufacturing the bracket 204, the holes 404 and 405 may be created by standard drilling procedures or more advanced procedures such as laser cutting or stamping. In another example, a forming drill may also be used on the holes 404 and 405 to elongate the depth and allow for a longer thread contact. To achieve the angle between sections 400 and 206 of the bracket 204, press brake bending dies or progressive die stamping may be used based on quantity needed. Additionally, the bracket 204 may be bent across the length to achieve a greater stiffness.

The bracket 204 may include one or more attachment feature(s) in the extended portion 206 for the swingarm cover 306 to be coupled to the bracket 204 via a cover-to-bracket fastener. This can be accomplished in many ways. One of which is shown in FIG. 4A through FIG. 4E, wherein two through holes 404 and 405 receive pressed in threaded inserts 406 and 407 to allow a connection point for the cover-to-bracket fasteners. Another example of this attachment could be done by placing unthreaded through holes 404 and 405 in the bracket 204 and using bolts and nuts to secure the swingarm cover 306 to the bracket 204. Another example illustrated in FIG. 4F utilizes four threaded holes 414, 415, 416, and 417 as attachment points on the bracket 204 for cover-to-bracket fasteners.

The bracket 204 may also include vibration dampening and/or cushioning material 412 on its surfaces, as shown in FIG. 4F. This additional material 412 may protect the motorbike swingarm 104 and/or the swingarm cover 306 from damage that may be caused by bracket 204 contact (rubbing and/or impacts). This material 412 may ideally exhibit low hardness, high resilience, and abrasion resistance. This added material 412 may be applied to the bracket 204 by some form of coating, mechanical attachment (fasteners) or adhesive (epoxy, tape or other).

FIG. 5A through FIG. 5F illustrate different views of the swingarm cover 306 of the example motorbike swingarm cover 102 illustrated in FIG. 1. FIG. 5A through FIG. 5F illustrate the swingarm cover 306 may be formed of a single unit of material. For example, the swingarm cover 306 may be formed of a single unit of plastic (e.g., synthetic plastic, organic plastic, semi-synthetic organic plastics), metal, composite (e.g., carbon fiber, car bon Kevlar, carbon graphite Kevlar), etc. In one example, the swingarm cover 306 may be formed of a single unit of polyethylene (e.g., ultra-high-molecular-weight polyethylene (UHMW), high-density polyethylene (PEX), medium density polyethylene (MDPE), linear low-density polyethylene (LLDPE), low-density polyethylene (LDPE), very low-density polyethylene (VLDPE), etc.). While FIG. 5A through FIG. 5F illustrate the swingarm cover 306 may be formed of a single unit of material, the swingarm cover 306 may be formed of multiple units of material. The swingarm cover 306 can be manufactured in many ways, with the main options being vacuum forming and injection molding. The swingarm cover 306 may have a cover thickness 506 of at least about ⅛ inches to at most about ¾ inches.

The interior surface 312 may closely follow the contour of the motorbike swingarm 104 which may lead the swingarm cover 102 to embody a c-channel shape comprising an interior surface 312 and an exterior surface 314, wherein the c-channel shape is at least three times longer than its widest cross-sectional dimension.

The swingarm cover 306 may include one or more additional apertures 504 and 505 in the rear cover region 320 for receiving one or more cover-to-bracket fasteners. For example, the swingarm cover 306 may have one or more countersunk through holes 504 and 505 for receiving at least a portion of the one or more threaded fasteners 310 and 311 which may thread into the bracket 204. Additionally, the swingarm cover 306 may include one or more apertures 508 and 509 and/or features in the front cover region 322 for allowing integration of a cable lashing 308 securement. For example, the swingarm cover 306 may have one or more through slots and for receiving at least a portion of the one or more hose clamps.

Figure 6A:
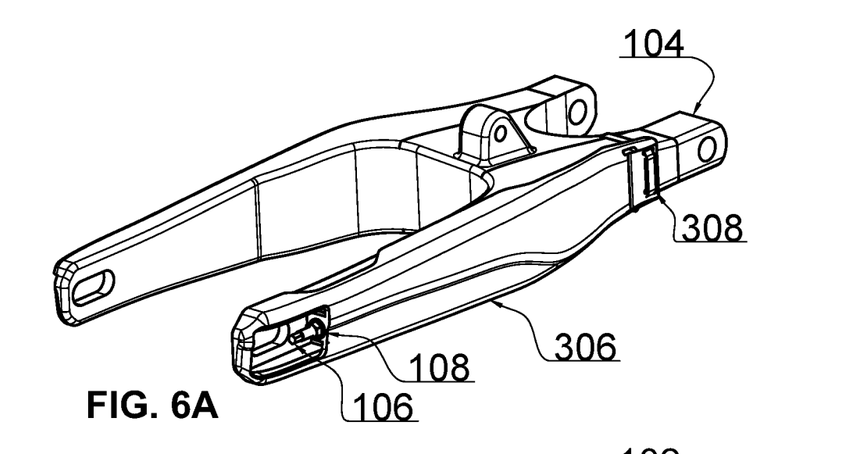
FIG. 6A illustrates a perspective view of an embodiment of the motorbike swingarm cover illustrated in FIG. 1.
Figures 6B, 6C, 6D:
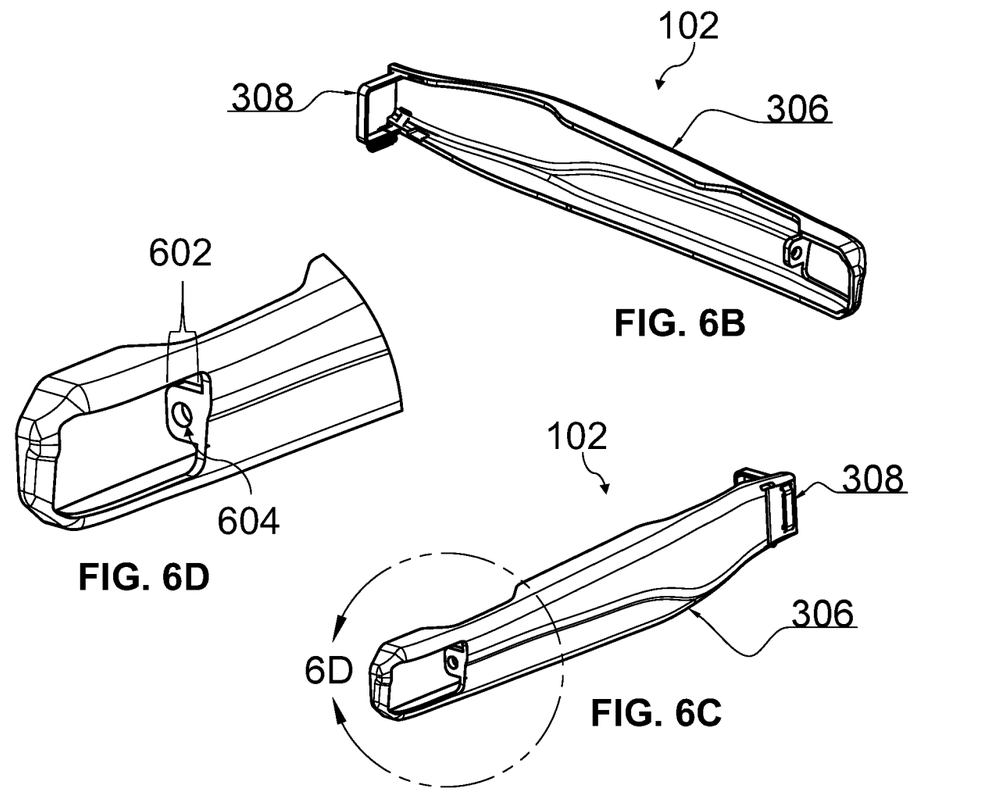
FIG. 6B illustrates a perspective view of an embodiment of the swingarm cover and cable lashing illustrated in FIG. 1.
FIG. 6C illustrates a perspective view of an embodiment of the swingarm cover and cable lashing of the motorbike swingarm cover illustrated in FIG. 1.
FIG. 6D illustrates a detail view 6D of FIG. 6C showing an embodiment the swingarm cover of the motorbike swingarm cover illustrated in FIG. 1.

FIG. 6A illustrates a perspective view of an embodiment of the example motorbike swingarm cover 102 comprising a swingarm cover 306 and cable lashing 308. This is possible due to the bracket 204 functionality being integrated into the swingarm cover 306 without the need for cover-to-bracket fasteners. This may be accomplished through the addition of an extended member 602, seen in FIG. 6D, onto the swingarm cover 306 in the rear cover region 500 extending in the opposite direction of the exterior surface 314. This extended member 602 being configured for attachment to the motorbike swingarm 104, wherein the mounting point is configured for a bracket-to-swingarm fastener. FIG. 6D illustrates an aperture 604 located on the extended member 602 of the swingarm cover 306 and is configured for attaching the swingarm cover 604 to the motorbike swingarm 104 via a bracket-to-swingarm fastener. The bracket-to-swingarm fastener being the axle adjustment bolt 106 and locking adjustment nut 108. The aperture 604 may have various geometric shapes so long as the axle adjustment bolt 106 may pass through/near the bracket 204 and thread into the motorbike swingarm 104, as done under normal operation, and the locking adjustment nut 108 can be tightened to the swingarm cover 306. For example, the aperture 604 may be a circular through hole with an inner diameter being larger than the outer diameter of the axle adjustment bolt 106, but no larger than the outer diameter of the locking adjustment nut 108, as seen in FIG. 6D.

The invention claimed is:

1. A motorbike swingarm cover comprising:
a protective cover configured to wrap at least the outer face and one additional face of a motorbike swingarm;
the protective cover having a rear region;
a mounting structure associated with the rear region of the protective cover, the mounting structure including either:
  (i) a separate bracket coupled to the protective cover with at least one fastener, or
  (ii) an integrated mounting extension of the protective cover;
wherein the mounting structure includes an aperture aligned to receive a chain adjustment bolt of the motorbike swingarm;
wherein the chain adjustment bolt passes through the aperture and threads into the swingarm such that tightening a nut on the chain adjustment bolt clamps the mounting structure against the motorbike swingarm; and
wherein the mounting structure is configured to transfer forces imparted on the protective cover to the motorbike swingarm during operation.

* * * * *